United States Patent
Perelshteyn-Zhao et al.

(10) Patent No.: US 11,803,626 B2
(45) Date of Patent: Oct. 31, 2023

(54) WIRELESS KILL SWITCH

(71) Applicant: Mewt LLC, Pen Argyl, PA (US)

(72) Inventors: Anna Perelshteyn-Zhao, Pen Argyl, PA (US); Peter Vincent Herzog, Barcelona (ES)

(73) Assignee: Mewt LLC, Pen Argyl, PA (US)

( * ) Notice: Subject to any disclaimer, the term of this patent is extended or adjusted under 35 U.S.C. 154(b) by 0 days.

(21) Appl. No.: 17/805,812

(22) Filed: Jun. 7, 2022

(65) Prior Publication Data

US 2022/0391485 A1    Dec. 8, 2022

Related U.S. Application Data

(60) Provisional application No. 63/202,360, filed on Jun. 8, 2021.

(51) Int. Cl.
*G06F 21/35* (2013.01)
*H04L 43/10* (2022.01)
*H04L 43/16* (2022.01)

(52) U.S. Cl.
CPC .............. *G06F 21/35* (2013.01); *H04L 43/10* (2013.01); *H04L 43/16* (2013.01)

(58) Field of Classification Search
None
See application file for complete search history.

(56) References Cited

U.S. PATENT DOCUMENTS

| | | |
|---|---|---|
| 8,498,618 B2 | 7/2013 | Ben Ayed |
| 8,539,559 B2 | 9/2013 | Nakhjiri |
| 8,918,854 B1 * | 12/2014 | Giobbi .................... H04W 4/08 726/9 |
| 9,047,494 B1 * | 6/2015 | Smith ..................... G06F 21/88 |
| 9,449,165 B2 | 9/2016 | Potbhare et al. |
| 9,558,336 B2 * | 1/2017 | Lee .......................... G06F 21/32 |
| 10,440,574 B2 | 10/2019 | Ledvina et al. |

(Continued)

FOREIGN PATENT DOCUMENTS

EP    1188102 A1    3/2002

OTHER PUBLICATIONS

Lindh; Bluetooth low energy Beacons; 2016; Retrieved from the Internet https://www.ti.com/lit/an/swra475a/swra475a.pdf; pp. 1-15 as printed. (Year: 2016).*

(Continued)

*Primary Examiner* — Michael W Chao
(74) *Attorney, Agent, or Firm* — Vos-IP, LLC

(57) ABSTRACT

A system comprising: a wireless kill switch and a computer; said wireless kill switch comprising: a housing, a radio transmitter, a microcontroller, an operable button, and a battery; said housing encasing the radio transmitter, the microcontroller, and the battery and allowing for operation of the operable button; the radio transmitter transmitting a continuous service signal to be received by a receiver on said computer and a heartbeat signal generated as a data packet on a first predetermined time basis; wherein said system maintains an operational state upon receipt of the continuous service signal and receipt of the heartbeat signal at a second predetermined time basis; and wherein the system modifies the computer to a different state than the operational state upon omission of the continuous service signal or the heartbeat signal.

9 Claims, 3 Drawing Sheets

(56) References Cited

U.S. PATENT DOCUMENTS

| | | | |
|---|---|---|---|
| 10,757,661 B1* | 8/2020 | Zhu | H04W 52/283 |
| 11,134,385 B2 | 9/2021 | Ziraknejad | |
| 11,140,157 B1 | 10/2021 | Xia et al. | |
| 11,343,232 B2 | 5/2022 | Gehret et al. | |
| 11,405,748 B2* | 8/2022 | Kuenzi | H04M 1/72421 |
| 11,520,870 B2 | 12/2022 | Xia et al. | |
| 2004/0203600 A1* | 10/2004 | McCorkle | H04L 63/162 |
| | | | 455/411 |
| 2004/0203895 A1* | 10/2004 | Balasuriya | H04M 1/72516 |
| | | | 455/456.1 |
| 2006/0242692 A1* | 10/2006 | Thione | G06F 21/43 |
| | | | 726/9 |
| 2007/0006290 A1 | 1/2007 | Li | |
| 2007/0054641 A1* | 3/2007 | Goedicke | H04W 52/50 |
| | | | 455/226.2 |
| 2008/0242278 A1* | 10/2008 | Rekimoto | H04W 4/021 |
| | | | 455/456.3 |
| 2009/0006846 A1 | 1/2009 | Rosenblatt | |
| 2009/0177892 A1* | 7/2009 | Steeves | G06F 21/34 |
| | | | 713/185 |
| 2011/0314539 A1* | 12/2011 | Horton | H04W 12/30 |
| | | | 726/20 |
| 2012/0036556 A1 | 2/2012 | Lebeau et al. | |
| 2013/0174252 A1 | 7/2013 | Weber et al. | |
| 2013/0237190 A1 | 9/2013 | Smith et al. | |
| 2013/0268766 A1* | 10/2013 | Schrecker | G06F 21/34 |
| | | | 713/185 |
| 2013/0268767 A1 | 10/2013 | Schrecker | |
| 2014/0173695 A1 | 6/2014 | Valdivia | |
| 2014/0240088 A1* | 8/2014 | Robinette | G08B 21/0219 |
| | | | 340/5.61 |
| 2015/0040210 A1* | 2/2015 | Faaborg | G06F 21/00 |
| | | | 726/16 |
| 2015/0161834 A1* | 6/2015 | Spahl | H04W 4/80 |
| | | | 340/5.61 |
| 2015/0172264 A1* | 6/2015 | Hardy | H04W 4/80 |
| | | | 726/4 |
| 2016/0300048 A1* | 10/2016 | Mason | G06F 21/31 |
| 2016/0306955 A1* | 10/2016 | Martin | G06F 21/34 |
| 2017/0091708 A1* | 3/2017 | Rao | G06Q 10/0833 |
| 2017/0359339 A1* | 12/2017 | Hevizi | H04M 1/72406 |
| 2018/0167816 A1* | 6/2018 | Kusens | G06F 21/60 |
| 2018/0249437 A1* | 8/2018 | Lindskog | G01S 13/878 |
| 2018/0307322 A1* | 10/2018 | Lopez Lecube | H04L 63/0853 |
| 2018/0338330 A1* | 11/2018 | Ledvina | H04W 12/50 |
| 2018/0365404 A1 | 12/2018 | Ulrich et al. | |
| 2019/0098004 A1* | 3/2019 | Mars | H04W 12/06 |
| 2019/0318074 A1* | 10/2019 | Ledwith | H04W 12/084 |
| 2020/0314925 A1* | 10/2020 | Fujii | H04W 4/80 |
| 2022/0014624 A1* | 1/2022 | De Zarraga | G08B 25/016 |
| 2022/0198851 A1* | 6/2022 | Avakjan | G06F 21/34 |
| 2022/0283258 A1* | 9/2022 | Henry | G01S 5/011 |
| 2022/0321561 A1* | 10/2022 | Jain | H04L 65/4015 |
| 2022/0394486 A1* | 12/2022 | Rodriguez Bravo | H04W 12/63 |

OTHER PUBLICATIONS

International Search Report issued in International Application No. PCT/US2022/072794 dated Sep. 9, 2022.

* cited by examiner

WIRELESS KILL SWITCH

CROSS-REFERENCE TO RELATED APPLICATIONS

This application claims the benefit of U.S. Provisional Patent Application No. 63/202,360 filed on Jun. 8, 2021, with the United States Patent and Trademark Office, the contents of which are incorporated herein by reference in their entirety.

FIELD OF THE INVENTION

The embodiments are directed to a device and related methods for wirelessly locking a computer based on connection or lack of connection with a wireless device.

BACKGROUND OF THE INVENTION

Security features within computing are a major issue faced by small and large companies. The classic issue is that a computer is left on and open, and the user steps away from their desk, even for just a minute. In that time, a bad actor accesses the computer. The access can be as simple as peeping at files, or downloading files, or uploading malware or other programs. The access can also be theft of the entire device and because it is unlocked allows substantial, if not complete, access to the computer and files therein.

In certain instances, access is not just to the individual computer, but to the system on which it is also connected. Many companies utilize a firewall device or other mechanical or software-based firewall to prevent bad actions, whether by software or hardware access. However, a computer that is completely logged into the company system may also bypass all of the safety mechanisms put into place. Thus, a compromised computer can lead to theft and serious issues for the company. This occurs not only in the private sector, but also in the public sector. Indeed, theft of confidential information and sabotage is a major issue in current world politics.

Current devices for automatic cutoff fail for several reasons. These include that the devices are a key to both lock and unlock and are otherwise connected to a third party network and therefore the device can be manipulated. Some devices fail because they only lock down a part of the system, but not the system at a base level. Other devices fail because they can only work on personal computers and not tablets and phones which may also be connected to the company networks.

Applicant has derived a new and elegant solution that provides for an automatic locking of a computer device or system as a whole at a system or zero-trust status, by blocking all methods of interaction of the device and returning the device to a preauthenticated state upon a distance threshold being met or other setting as defined by the user.

SUMMARY OF THE INVENTION

In a preferred embodiment, a wireless kill switch comprising a continuous service transmission and an intermittent transmission, receipt of both which is necessary to provide normal operations to a computer.

In a preferred embodiment, a system for automatically locking a computer comprising: a computer comprising a processor, memory, and operable software, said computer further comprising a receiver, and a wireless kill switch, said wireless kill switch comprising a transmitter and not a receiver, said transmitter operable for transmitting a continuous service signal transmission and an encrypted intermittent heartbeat transmission, receipt of both of which is necessary to provide normal operations of the computer, and wherein upon interruption of at least one of the continuous service transmission or intermittent transmission, the system, via the software, performs an operable function to modify the normal operation to a second state.

In a preferred embodiment, a method for increasing computer hygiene of a computer comprising: transmitting a continuous signal and an intermittent heartbeat signal from a wireless transmitter; receiving the continuous signal and the intermittent heartbeat signal at a receiver on said computer; creating a normal state of said computer when receiving both the continuous signal and the intermittent heartbeat signal; and creating a second state on said computer upon interruption of at least one of the continuous signal or the intermittent heartbeat signals.

In a preferred embodiment, a wireless kill switch comprising: a housing, a radio transmitter, a microcontroller, an operable button, and a battery; said housing encasing the radio transmitter, the microcontroller, and the battery and allowing for operation of the operable button; and wherein the radio transmitter transmits a continuous signal and generates a heartbeat signal on a regularly timed interval.

In a further preferred embodiment, the wireless kill switch wherein said heartbeat signal is a data packet transmitted with said continuous signal.

In a further preferred embodiment, the wireless kill switch wherein said heartbeat signal is transmitted at between 0.1 second and 60 seconds.

In a further preferred embodiment, the wireless kill switch wherein the operable button stops the continuous signal and/or the heartbeat signal. In a further preferred embodiment, wherein the operable button transmits a data packet to be received by the receiver to perform an operable action.

In a further embodiment, a system comprising: a wireless kill switch and a computer; said wireless kill switch comprising: a housing, a radio transmitter, a microcontroller, an operable button, a gyroscope, and a battery; said housing encasing the radio transmitter, the microcontroller, and the battery and allowing for operation of the operable button; the radio transmitter transmitting a continuous signal to be received by a receiver on said computer and a heartbeat signal generated as a data packet on a first predetermined time basis; wherein said system maintains an operational state upon receipt of the continuous signal and receipt of the heartbeat signal at a second predetermined time basis; and wherein the system modifies the computer to a different state than the operational state upon omission of the continuous signal or the heartbeat signal.

In a further preferred embodiment, the system further comprising a user-defined signal threshold, wherein the modification to a different state than the operation state is performed when the continuous signal is received at a signal power level below a user defined signal threshold.

In a further preferred embodiment, the system wherein the user-defined signal threshold corresponds to a distance of under 10 meters. In a further preferred embodiment, the system wherein the user-defined signal threshold is an RSSI decibel level between a weakest signal of −99 dBm and a highest decibel reading of −1 dBm. In a more preferred embodiment, the system wherein the RSSI decibel level is between −89 dBm and −10 dBm, more preferably between −70 dBm and −30 dBm.

In a further preferred embodiment, the system wherein the continuous signal is a radio signal. In a preferred embodiment, wherein the radio signal is a Bluetooth Low Energy (BLE) signal.

In a further preferred embodiment, the system wherein the data packet is transmitted at between 1 second and 30 seconds.

In a further preferred embodiment, the system wherein the different state is a nonauthenticated state.

In a further preferred embodiment, the system wherein the different state disables one or more selected from the group consisting of: a microphone, a camera of the computer, USB mass storage of the computer, WiFi, and Ethernet networking connections of the computer, deleting temporary files, system cache, and user-selected files on the computer, and combinations thereof.

In a further preferred embodiment, the system wherein said system is locked upon activation of the operable button.

In a further embodiment, a method of wirelessly locking down a computer comprising: (a) receiving a continuous signal and a heartbeat signal data packet from a transmitter; (b) determining whether the continuous signal is above a predefined signal level threshold; (c) determining whether the heartbeat signal data packet is received within a predefined time period; and (d) locking down said computer when either the continuous signal is below the predefined threshold or the heartbeat signal data packet is not received within the predefined time period.

In a further preferred embodiment, the method further comprising a startup phase providing a delay of a predetermined amount of time when the transmitter is first connected to the computer. In a further preferred embodiment, the method wherein the startup delay is between 10 seconds and 60 seconds.

In a preferred embodiment, a wireless kill switch comprising: a housing, a radio transmitter, a microcontroller, an operable button, and a battery; said housing encasing the radio transmitter, the microcontroller, and the battery and allowing for operation of the operable button; and wherein the radio transmitter transmits a continuous service signal and transmits a heartbeat signal on a regularly timed interval.

In a further preferred embodiment, the wireless kill switch wherein said heartbeat signal is a data packet transmitted intermittently with said continuous service signal. In a further preferred embodiment, the wireless kill switch wherein said heartbeat signal is transmitted at between 0.1 second and 60 seconds.

In a further preferred embodiment, the wireless kill switch wherein the operable button ceases transmission of the continuous service signal, the heartbeat signal, or both.

In a further preferred embodiment, the wireless kill switch wherein the continuous service signal is generated as a Bluetooth Low Energy transmission, said Bluetooth Low Energy transmission being a data packet transmitted from the radio transmitter at between every 1 millisecond and every 10 seconds.

In a further preferred embodiment, the wireless kill switch wherein the wireless kill switch does not contain a receiver.

In a further preferred embodiment, the wireless kill switch further comprising one or more of: a gyroscope, a wireless charging device, a charging port, an LED indicator, and combinations thereof. In a further preferred embodiment, the wireless kill switch wherein the gyroscope modifies the wireless kill switch from a first power state to a second power state. In a further preferred embodiment, the wireless kill switch further comprising firmware sufficient to operate hardware on said wireless kill switch.

In a preferred embodiment, a method of remotely modifying a state of a computer comprising: (a) receiving a continuous service signal and a heartbeat signal from a paired device having transmission capabilities and not receiving capabilities; (b) after receiving the continuous service signal, determining whether the continuous service signal is above a predefined threshold; (c) determining whether the heartbeat signal is received within a predefined time period; and (d) performing an operable action upon receipt of the continuous service signal at below the predefined threshold, receipt of the heartbeat signal outside of the predefined time period, or both; wherein the operable action takes the computer from a first operational state to a second state.

In a further preferred embodiment, the method further comprising wherein the continuous service signal is generated from a transmitter within said paired device, wherein said transmission capabilities are Bluetooth Low Energy transmission.

In a further preferred embodiment, the method wherein the continuous service signal is transmitted at between every 1 millisecond and every 10 seconds. In a further preferred embodiment, the method wherein the heartbeat signal is transmitted as a data packet intermittently with the continuous service signal at between every 10 milliseconds and every 60 seconds.

In a further preferred embodiment, the method wherein the continuous service signal and the heartbeat signal are encrypted.

In a further preferred embodiment, the method wherein the predefined threshold is based upon a received signal strength indicator. In a further preferred embodiment, the method wherein the received signal strength indicator is defined between −99 dBm and −1 dBm.

In a preferred embodiment, a system comprising: a wireless kill switch and a computer; said wireless kill switch comprising a housing, a radio transmitter, a microcontroller, an operable button, a battery, and firmware sufficient to operate and transmit a signal from said radio transmitter; said housing encasing the radio transmitter, the microcontroller, and the battery and allowing for operation of the operable button; the radio transmitter transmitting a continuous service signal to be received by a receiver on said computer and a heartbeat signal generated as a data packet on a first predetermined time basis; wherein said system maintains an operational state upon receipt of the continuous service signal and receipt of the heartbeat signal received within at least a second predetermined time basis; and wherein the system modifies the computer through an operable action to a different state than the operational state upon omission of the continuous service signal or receipt of the heartbeat signal outside of the second predetermined time basis.

In a further preferred embodiment, the system further comprising a user-defined signal threshold wherein the operational state is maintained when the continuous service signal is received at above the user-defined signal threshold. In a further preferred embodiment, the system wherein the user-defined signal threshold corresponds to a measured decibel level from the continuous service signal.

In a further preferred embodiment, the system wherein the continuous service signal is a radio signal. In a further preferred embodiment, the system wherein the continuous service signal is Bluetooth Low Energy.

In a further preferred embodiment, the system wherein the data packet is transmitted at between 10 millisecond and 60 seconds.

In a further preferred embodiment, the system wherein the first predetermined time basis is between 10 millisecond and 60 seconds and wherein the second predetermined time basis is equal to or longer than the first predetermined time basis.

In a further preferred embodiment, the system wherein the different state is selected from the group consisting of: deleting files, cleaning random access memory (RAM), cleaning cache, cleaning swap space, disabling a camera, disabling a microphone, disabling a network adapter, disabling wireless transmission or wireless communication, disabling Bluetooth, disabling features such as "find my device," placing the computer into a nonauthenticated state, shutdown of the computer, and combinations thereof.

In a further preferred embodiment, the system wherein upon activation of the operable button the operable action is performed.

In a further preferred embodiment, the system further comprising a startup phase providing a delay of a predetermined amount of time before performing the operable action when the computer is first authenticated.

In a preferred embodiment, a method of increasing hygiene of a computer comprising: (a) receiving a continuous service signal and a heartbeat signal from a transmitter; (b) determining whether the continuous service signal is above a predefined threshold; (c) determining whether the heartbeat signal is received within a predefined time period; and (d) performing an operable action, wherein a software loaded on the computer performs the operable action when either the continuous service signal is received below a user-defined threshold or the heartbeat signal is not received within the user-defined threshold, thereby moving the computer from a first operational state to a second state.

In a further preferred embodiment, the method further comprising wherein transmission of the continuous service signal is generated from the transmitter, wherein the transmitter is paired with a computer, wherein said transmission is a Bluetooth Low Energy transmission.

In a further preferred embodiment, the method wherein the continuous service signal is transmitted at between every 1 millisecond and every 10 seconds. In a further preferred embodiment, the method wherein the heartbeat signal is transmitted as a data packet intermittently with the continuous service signal at between every 10 milliseconds and every 60 seconds.

In a further preferred embodiment, the method wherein the continuous service signal and the heartbeat signal are encrypted.

In a further preferred embodiment, the method wherein the predefined threshold is based upon a received signal strength indicator. In a further preferred embodiment, the method wherein the received signal strength indicator is defined between −99 dBm and −1 dBm.

DETAILED DESCRIPTION OF THE INVENTION

Figure 1:
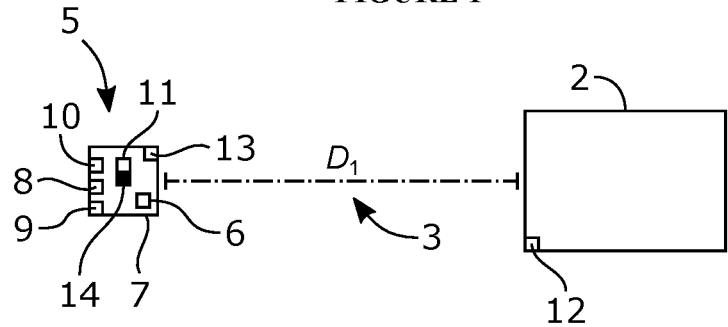
FIG. 1 depicts an embodiment of a system with a wireless kill switch.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

As used herein, the below terms will have the following meanings as may be supplemented elsewhere in this specification:

As used in this application, the words "a," "an," and "one" are defined to include one or more of the referenced items unless specifically stated otherwise. The terms "approximately" and "about" are defined to mean±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

As used herein, the term "computer" refers to any computing device that comprises a processor, memory, a and receiver and is able to execute code to store or retrieve information, and other such necessary hardware, firmware, and software to perform the necessary tasks for carrying out the receiving of signals as defined herein, such devices therefore include but are not limited to a laptop computer, personal computer, a desktop computer, netbook, a tablet, a mobile phone, a smartwatch, wireless or wired payment stations, and other such wearable devices.

As used herein, Bluetooth Low Energy (BLE) means a Bluetooth protocol operating within the 2.4 GHz ISM band.

As used herein, the term "continuous service signal" means the generation of data from a radio transmitter, preferably under the BLE protocol to maintain noninterrupted service of communication between the transmitter and the receiver. Typically, BLE generates data from the transmitter and then turns off the transmitter, even for milliseconds, before sending a further transmission. As received by the receiver, this provides continuous service, even if the transmission itself is not transmitting at every timepoint between $time_0$ and $time_1$. This is analogous to a motion picture, wherein the picture, while it appears continuous, is a series of still images rotated at a rate, such as 60 frames per second or 120 frames per second. Accordingly, the continuous service provides transmission at about every 1 millisecond to every 10 seconds.

As used herein, the term "heartbeat signal" refers to an intermittently transmitted signal that can be transmitted with the continuous service signal or through a separate transmission on a regular but intermittent basis. In practice the heartbeat signal will never be sent as much as the continuous service signal. The heartbeat signal is transmitted most preferably at between about every 10 milliseconds and about every 60 seconds depending on the particular use case desired by the user.

As used herein, the term RSSI means the received signal strength indicator and is the power present in a received radio signal. Typically, this is measured in decibels, with a nominal range of between −99 dBm and −1 dBm and most commonly received at between −89 dBm and −20 dBm.

As used herein, the term "nonauthenticated state" is used when in reference to a computer and refers to a state of the computer wherein credentials (such as a password, a code, a unique ID, or the like) are required to provide access for a given user to access the computer. This may include preauthenticated states such as before the system has verified the identity and right to access the device, a locked system such as where the system locks access due to inactivity or via action of a user, or any other time where access to the computer is limited or denied and requires entry of credentials to grant access.

Accordingly, the embodiments of the present disclosure provide for new devices, systems, and methods for increasing the safety of computing. Safe computing is a key issue faced by many companies. By safe computing, it is understood that access to files and servers from a computer is limited to the authorized user and not to some outside actor. Theft of information from a computer or the computer network has been documented to lead to losses, including theft of credit card numbers, social security numbers, medical history, other personal information, etc. When a bad actor is able to gain unauthorized access through an unlocked computer, an opportunity was missed to use the embodiments of the present disclosure to lock down the computer and prevent such theft.

Typical computing access point devices allow both access and deaccess to the computer. This is problematic, however, as allowing access then allows for the theft of the access point device to gain unauthorized entry to the computer. Thus, instead of stealing only the computer, a bad actor merely needs to also steal the access point device, or, in some cases only steal the access point device to gain access via another computer.

Users of computing systems, however, are prone to lapses in judgment or protocols that leave a critical computing system vulnerable. One prominent issue is that while users understand the security risk, they become complacent to safety standards as they feel that nothing is going to happen to them. This is a common fallacy in which a user on a system fails to recognize that they are being targeted until the bad actor has already penetrated the computer system. This complacency allows users to leave their access point device in easy to access locations or to simply not lock their computer when leaving.

Another common issue with existing computing accessing point devices is that they allow for two-way communication between the computer and the computing access device. This allows for a bad actor to intercept these messages and to falsify, for example, a credential, to maintain access or grant access, when access should be denied. Such systems create perceived safety, but which can be easily manipulated in planned attacks.

Applicant has created an improved system for performing an operable action, such as locking the computer down to the zero-trust status (e.g., a nonauthenticated state) and blocking all methods of interaction for the computer and to return the computer back to a nonauthenticated state or another predetermined action. This provides for an advantage over existing cybersecurity devices and improves cybersecurity hygiene for users by allowing an operable action to be automatically performed. Each computer includes the appropriate hardware, firmware, and software to enable the computer to function as intended and as needed to implement features detailed herein. For example, a general-purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other microprocessing or central processing unit (CPU). Likewise, the memory may be any suitable memory device such as random access memory (RAM), dynamic random access memory (DRAM), or Static RAM (SRAM), without limitation. The processor together with at least the memory may implement system and application software including instructions, including methods, disclosed herein. Examples of suitable storage includes magnetic disk drives, optical disc drives, tape drives, an internal storage device, an attached storage device, flash memory, hard drives, and/or solid state drives (SSD), although embodiments are not so limited.

The wireless kill switch, as described herein, is a physical hardware device that comprises a transmitter that broadcasts a signal on a regular or continuous basis to generate a continuous service with a connected computer. Notably, the wireless kill switch does not contain a receiver, and thus the device only transmits. As shown in FIG. 1, the wireless kill switch (5) comprises a transmitter (6), a battery (8), a microcontroller (9), a physical button (11) or switch defined within or on a housing (7), and optionally a gyroscope (10) and a wireless charging component (13). Each of these elements are operably connected to be powered by the battery (8) on the wireless kill switch (5) and operated by the microcontroller (9). The microcontroller (9) is utilized in connection with certain firmware that provides basic instructional code to operate the hardware elements on the wireless kill switch (5), which may be stored, for example, within some memory attached to the microcontroller. The firmware provides appropriate information to generate the proper transmissions of a continuous service signal as well as the heartbeat signal from the wireless kill switch (5).

The transmitter (6) is preferably utilizing radio communications, for example, Bluetooth Low Energy (BLE). The transmitted signals are then received by an appropriate receiver operably connected to a computer comprising the receiver, wherein the computer comprises certain software to manage and control the receipt of signals from the wireless kill switch (5). The transmitter and receiver are preferably communicating via a BLE signal. Software operable on the computer creates a connection between the transmitter and the receiver and then the software creates certain instructions to perform one or more actions upon the receipt of or lack of the continuous service signal and/or the heartbeat signal.

The continuous service signal enables the software to determine signal strength, which functions as a metric of distance between the transmitter and the receiver. The receiver uses a received signal strength indicator (RSSI) to measure the power level at a corresponding receiver in decibels on a logarithmic scale, with the received signal corresponding to a distance between the transmitter and the receiver. Upon receiving the signal, the software on the computer will interpret and translate actions to the computer to take some operable action, if appropriate. These actions may include but are not limited to: doing nothing, muting or unmuting a microphone, enabling or disabling a camera, enabling or disabling a drive, enabling or disabling wireless transmission, locking one or more functions on the computer, locking all functions on the computer, moving the computer to a nonauthenticated state, and combinations thereof, as nonlimiting examples.

The computer (2) serves as the target device and comprises a receiver (12) to receive the transmission from the transmitter (6), as well as appropriate hardware to store and execute software to recognize the data received from the transmitter. Thus, the computer (2) receiving the transmission comprises the software that is running on the computer (2), as understood by those of ordinary skill in the art, to interpret the signals being transmitted from the wireless kill switch (5). A connection between the transmitter and the receiver preferably allows for encoded or unique connection between the two devices in order to maintain security.

Accordingly, the wireless kill switch (5) does at least two things. First, through the transmitter (6), a continuous service signal is transmitted. Second, a heartbeat signal is intermittently transmitted at a regular time basis, but not continuously. For example, the heartbeat signal is transmitted every few seconds, instead of at the higher rate of the continuous service signal. These two aspects work in conjunction to define a connection from the wireless kill switch (5) and to transmit an appropriate signal to be received by a receiver (12) positioned on or within the computer (2). The continuous service signal, when received at the receiver is determining a power level, whereas the heartbeat is a failsafe signal that is confirming that the continuous service signal is not being manipulated or some other malicious issue has occurred. The continuous service signal is preferably a small packet of data (service packet) sent every 1 millisecond to about every 10 seconds in order to maintain the continuous service, and most preferably every 3 milliseconds to every 1 second, whereas the heartbeat is then preferably attached to a normal service packet intermittently, such as every 10 milliseconds to about every 60 seconds but not as frequently as the continuous service signal. Thus, the heartbeat serves as a failsafe between the application software and the operating system that controls the driver receiving the service that the device is still operating normally.

The transmitter (6) is a wireless transmission device that provides a transmission of a signal, for example, Bluetooth Low Energy (BLE). Nominally, this transmission is a signal that has a defined strength that can be measured at the receiver, for example, by RSSI. The strength of the signal, as received by the receiver (12) decreases as the distance between the transmitter (6) and the receiver (12) increases. Thus, at a distance of one meter, the received signal will be stronger than the received signal when transmitted at a distance of twenty meters. Thus, the signal strength can be used to quantify a distance between the transmitter and a receiver. Typically, an RSSI will be between −99 dBm and −1 dBm. The distance between the wireless kill switch (5) and the computer is detailed with a distance $D_1$ (3). The signal is provided so as to generate a continuous service connection, and thus data is transmitted and is received by the receiver (12) on a basis sufficient to maintain this continuous service. Thus, a data packet may be sent every 1 millisecond to every several seconds, even 10 or more seconds, and maintain continuous service connection. However, as known to those of ordinary skill in the art, the signal can be interrupted from time to time and maintain this continuous service. Momentary interruptions are intended to be captured within this "continuous" definition; however, such interruptions longer than a just a few seconds may fail a heartbeat signal and may cause the software to take a predetermined operable action.

While the wireless kill switch (5) generates the continuous service signal, it simultaneously disseminates a heartbeat signal, for example once every 10 milliseconds to every 60 seconds, with all time points in between. Preferably, the heartbeat signal is provided at between 1 second and 10 seconds in order to maximize battery life. The heartbeat signal is layered on top of the continuous service signal, such that both the continuous service signal and the heartbeat signal are transmitted by the transmitter and then received by the receiver (12). The heartbeat signal may be a packet of data that is transmitted over the continuous service signal or via another transmission that can be generated by the transmitter (6). This provides two layers of transmission and reception between the wireless kill switch (5) and the receiver (12) on the computer (2) in order to provide layers of security.

As the transmission is occurring, the transmitted signal is received by a receiver (12) on a computer (2). The computer (2) comprises software that decodes the received transmission and takes appropriate actions based upon the received transmission. This leads to several different states, for example: (a) normal operations; (b) kill of one or more elements on the computer based on no signal being received; (c) kill of one or more elements on the computer based on the RSSI being below a predefined threshold; (d) kill of one or more elements on the computer based on no heartbeat being received; (e) an action based on operation of the manual switch on the wireless kill switch (5); and (f) combinations of the above.

In certain embodiments, the wireless kill switch further comprises a gyroscope (10). The gyroscope (10) can be further utilized in certain applications to modify the signal strength, timing for signal transmission, transfer speeds, or other aspects related to the transmission of signals from the transmitter (6). The gyroscope (10) can thus increase or decrease any such of these elements upon movement or after no movement for a predetermined time, such as after one minute, two minutes, five minutes, ten minutes, thirty minutes, sixty minutes, etc. This allows for further power usage of the kill switch. For example, when the gyroscope (10) does not detect any movement, and the RSSI is strong, an assumption may be made that the wireless kill switch (5) is held adjacent to the computer and computing is safe. Thus, the transmission rate may be reduced in time or power, or transfer speed, or another variable. However, upon movement detected at the gyroscope (10), the wireless kill switch (5) goes from a rest phase to an awake phase and returns to a full power transmission. This allows for certain power consumption savings to extend battery life of the wireless kill switch (5) or to perform certain other functionalities based upon a sleeping or awake state as determined by the gyroscope (10).

Figure 2:
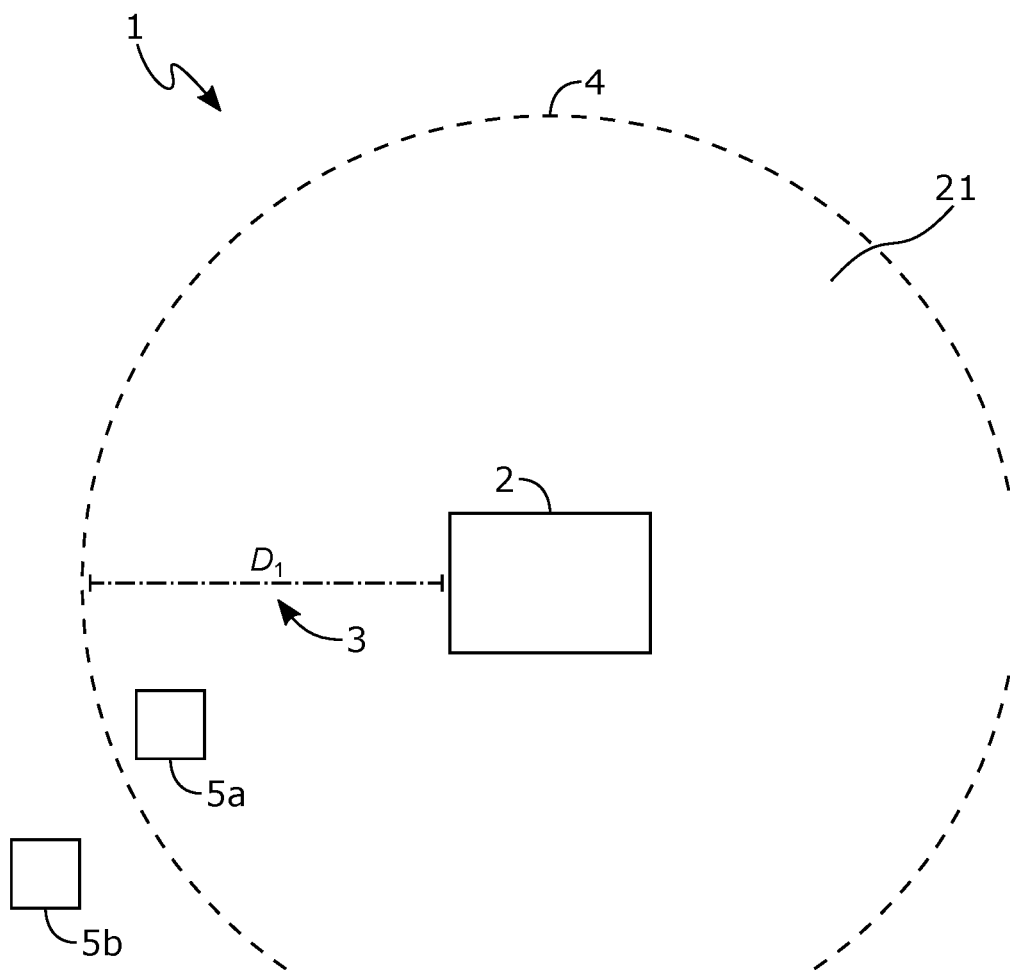
FIG. 2 depicts a further detail of a system using a wireless kill switch.

FIG. 2 defines a simple diagram of the functions of the wireless kill switch (5). The computer (2) working together in a system (1) comprising the wireless kill switch (5) comprises an operating envelope (21), which is roughly defined by the circumference (4) denoted around the computer (2). A distance $D_1$ (3), functions as the radius for which the wireless transmission from the wireless kill switch (5) can be received by the computer, typically around 100 meters without obstruction, though it may be reduced. Thus, a wireless kill switch at position (5a) is within the envelope and thus the continuous service signal can be received by the computer. By comparison, a wireless kill switch at position (5b) is outside of the envelope (21) and no continuous service signal is received. The distance $D_1$ (3) is variable based upon a number of factors including the strength of the radio transmission and interference, among other elements.

When the wireless kill switch (5) is within the envelope (21), e.g., at position (5a), the receiver (12) operably connected to the computer receives the continuous service signal and typically maintains normal computer system operations. This is the normal or operable "on" state for the computer and is assumed that the wireless kill switch (5) is safely allowing use of the computer. However, upon passing beyond the circumference (4), and outside of the working envelope (21) to a wireless kill switch at position (5b), the continuous service signal would not be received by the receiver (12), and the computer (2) would then, via the software, perform an operable action, such as to default down to a nonauthenticated state or other state as defined by the software/user on the computer.

Figure 3:
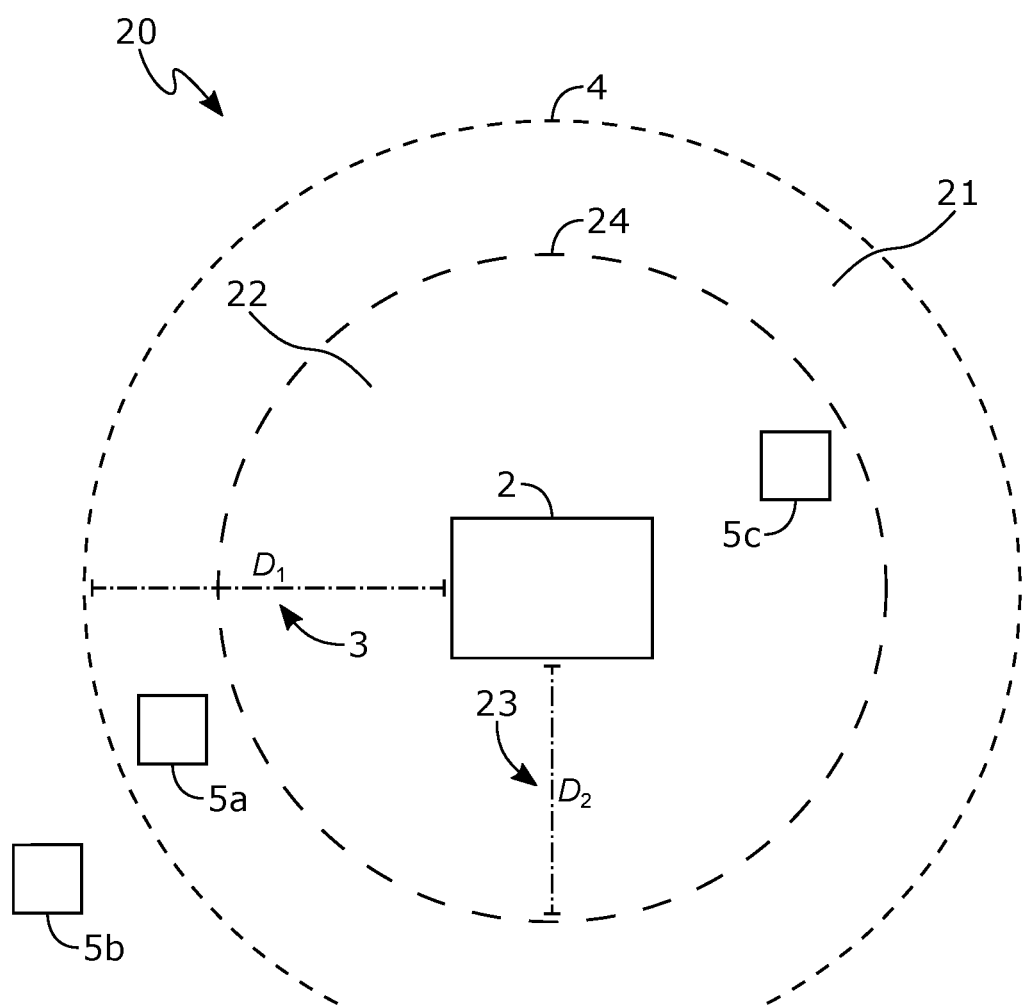
FIG. 3 depicts an embodiment depicting a system and a user defined threshold for the wireless kill switch.

$D_1$ (3) is an operational limit. However, the user can further define a distance threshold, which is measured by the signal strength, to be utilized for the on and off state. For example, while distance $D_1$ (3) is the operating distance and defined in FIG. 3 as about 100 meters, the user may define a user-defined distance $D_2$ (23) from which the signal is received and measured at a given decibel level. The user can then define the appropriate decibel level that corresponds to an approximate distance between the wireless kill switch (5) and the computer (2) as measured by the RSSI. When distance $D_2$ (23) is reached, as defined by a user, even though distance $D_1$ (3) is operational, the operable action, e.g., lockdown, is initiated. Thus, FIG. 3 details a user defined scenario (20) comprising a user-defined envelope (22), which has a smaller working distance $D_2$ (23) between the wireless kill switch (5) and the computer (2) before the operable action is enacted. Thus, the user can define a user defined circumference (24), providing a user-defined envelope (22) from the computer (2) in which the kill switch is being detected. For example, at position (5c), within the user-defined envelope (22), the kill switch would transmit a continuous service signal and based on the defined RSSI value received determined that the wireless kill switch at position (5c) is within the user-defined envelope (22). This distance is shorter than operating distance $D_1$ (3). By contrast, operating distance $D_1$ (3) would allow the kill switch at position (5a) to be detected but beyond the user-defined envelope (22), and the kill switch at position (5b) would be outside of the operating envelope (21) and thus not detected at all. Similar to FIG. 2 above, once user-defined distance $D_2$ (23) threshold has been exceeded (by measurement of the RSSI below the user-defined envelope [22]), the software on the computer will perform steps to take the operable action, e.g., go into one or more predetermined lockdown states. Accordingly, the continuous service signal being generated from the wireless kill switch (5) and received by the receiver (12) would be at a lower decibel to identify this distance threshold and then create the operable action, such as a predetermined lockdown. Thus, moving from position (5c) to position (5a) would increase the distance between the transmitter and the receiver and thus reduce the received signal decibel level, thereby moving the wireless kill switch outside of this user-defined envelope (22) and activating the operable action, e.g., a lockdown state.

As a layer within this system (1), the continuous service signal is also provided with a heartbeat signal. Thus, as the continuous service signal is generated, a heartbeat signal is provided on a regular interval but less frequently than the continuous service signal. The wireless kill switch (5) and the computer (2) also interact with the heartbeat signal to ensure that a heartbeat signal is received at this regular interval but less frequently than the continuous service signal. The system will detect the heartbeat signal, and if no heartbeat signal is received for a predetermined period, despite the receipt of the continuous service signal within the RSSI threshold, the system, via the software, would perform the operable action, such as going into the predetermined lockdown state.

This second layer is created to ensure that if the wireless kill switch has been tampered with or encountered another error, or the computer (2) itself has been tampered with, access will be terminated. The layered approach increases the safety of the system to prevent unauthorized access. Thus, it will be necessary to maintain both the ordinary continuous service signal as well as the heartbeat signal to maintain normal operations of the computer (2). Thus, while receipt of a continuous service signal at a decibel below a user defined threshold as measured by the RSSI will cause the operable action to occur, the lack of a received heartbeat signal will also signify that something has occurred that requires performing of the operable action, such as a lockdown action of the computer (2). Thus, the system can be configured to measure the time since the last heartbeat was received and upon a predetermined amount of time since such occurrence, perform the operable action. The heartbeat signal may be generated every one second and serves the first predetermined time period (the timing for transmission of each heartbeat signal). However, the user may set a second predetermined time period, for example, if the time since the last heartbeat signal received is set at five seconds, if no heartbeat is received by the computer (2) for five seconds, the computer will perform the operable action as dictated by the system. Of course, the first and second predetermined time periods may be set to be the same time.

Finally, the system can operate by manual iteration of a button on the wireless kill switch. Physical button (11) is a simple on/off switch or another switch (binary, tertiary, or other), that allows a normal resting state (button not pressed), and then activation by pressing the button or activation of one or more different positions (i.e., a tertiary switch). Here, as one nonlimiting example, pressing the button serves as a manual kill switch. Pressing this button overrides the heartbeat and the continuous service signal to take the predefined operable action. One can imagine such a scenario where the user notices a theft in progress, or some other issue requires locking the computer while the wireless kill switch (5) is still in proximity to the computer (2) itself. Upon pressing or activation of the physical button (11), the action can function by the wireless kill switch (5) transmitting a data packet or, can cease transmission as nonlimiting examples of how to perform the manual kill operation.

This lends itself to use of the wireless kill switch (5) as something carried on a person. It is envisioned that the wireless kill switch (5) is something like a dongle or attachment that can be attached to a purse, a wallet, a belt, held in a pocket, attached to a car key, attached to a lanyard, a key fob, or other security feature that are normally used to hold keys, key cards, and the like. Thus, a person moving away from their computer, will automatically reach the kill distance and lock the computer, or the user is able to manually lock the computer if they are otherwise in range of the device and require such lockdown.

Thus, in a preferred embodiment, the system operates by maintaining a continuous service signal being deployed and that is received by the receiver within a predetermined signal strength threshold. Setting this example as within ten meters (corresponding to a decibel measure at the receiver of −50 dBm) that means that the wireless kill switch, being within the ten meters (i.e., the strength received is above −50 dBm), will operate the computer normally. However, by stepping to eleven meters away, an RSSI of −55 dBm for example, the computer will perform some operable action. Simultaneously, a heartbeat signal is being transmitted every 5 seconds and is required to be received every 15 seconds (5 seconds and 15 seconds being parameters set by the user) to maintain the normal operational state of the computer (2). The system will only maintain unlocked normal operation if both the continuous service signal and the heartbeat signal are received within the −50 dB level, and where the heartbeat signal is received at least every 15 seconds.

If one of the continuous service signal or the heartbeat signal parameters are not met, the computer will automatically take the operable action. This operable action may be one of any number of hygiene applications, and most preferably to lock the computer. The action can be modified based on the needs of the user, but preferably the system is restored to a nonauthentication state, or a zero-trust state, which prevents unauthorized use of any of the components of the computer.

Other actions may be taken by the system in response to either the receipt of a signal weaker than the predetermined threshold or the lack of a heartbeat signal, which including at least: deleting files, cleaning random access memory (RAM), cleaning cache, cleaning swap space, disabling a camera, disabling a microphone, disabling a network adapter, disabling wireless transmission or wireless communication, disabling Bluetooth, disabling features such as "find my device," placing the computer into a nonauthenticated state, shutdown of the computer, and combinations thereof. These features and options are in addition to any other actions deemed appropriate by the systems administrator.

Notably, the wireless kill switch (5) is able to be utilized with nearly any computer in order to create safer computing by increasing the safety for the use of such devices. Thus, such wireless kill switch (5) has a wide set of potential uses in order to provide security for such computers.

Figure 4:
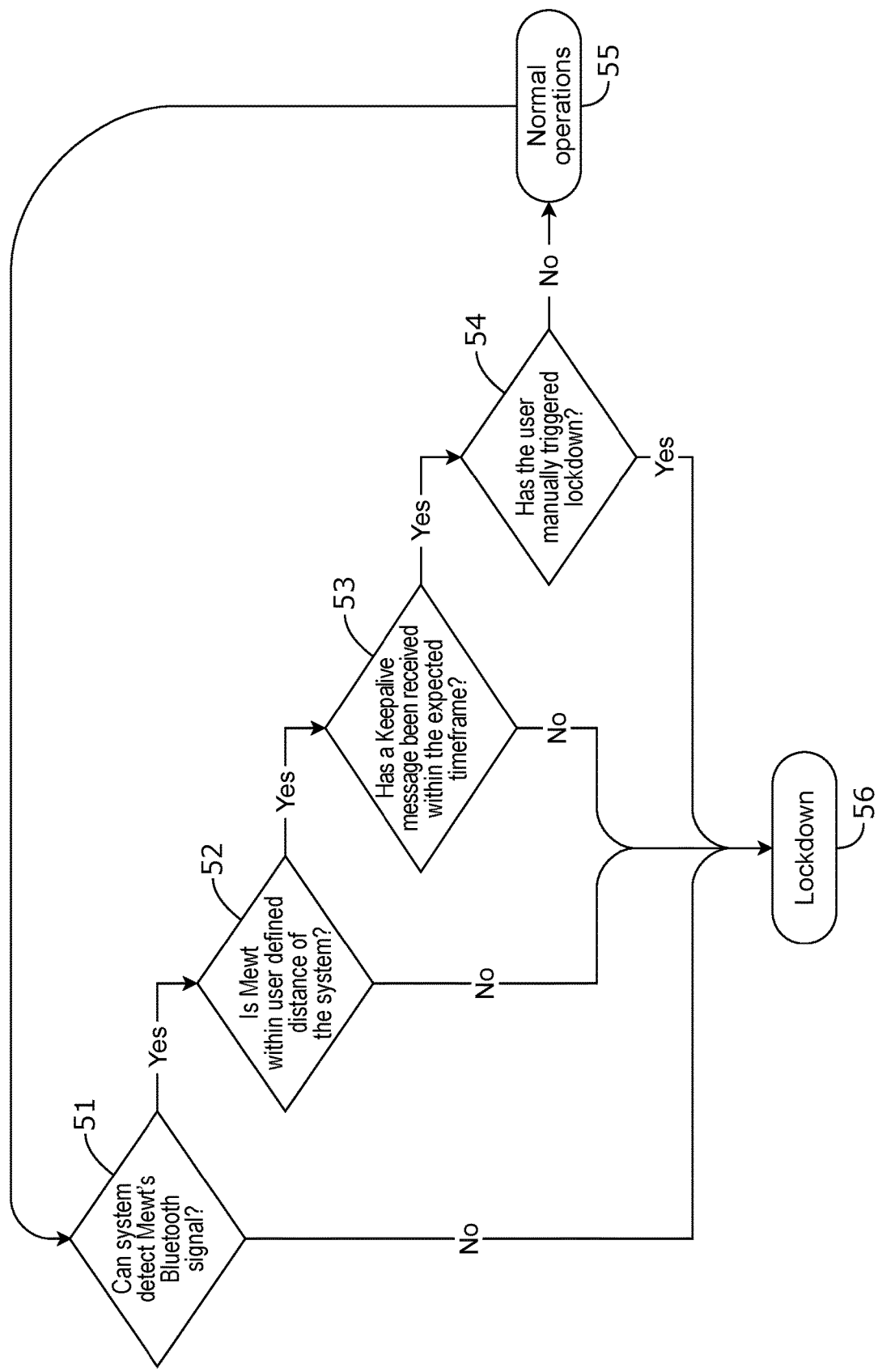
FIG. 4 depicts a flow diagram of a wireless kill switch.

FIG. 4 provides a flow diagram that details a simple version of the system (1). The decision tree in step 1 determines if the system can detect the wireless kill switch signal (51), here defined as a Bluetooth signal. If no, the system performs the operable action (56). If yes, step 2 determines whether the wireless kill switch (5) is within the user-defined envelope (22) of the system (52). Thus, the RSSI is measured and compared to the user defined signal strength. If no (i.e., the RSSI is below the user defined threshold), the system performs the operable action (56). If yes, the system determines if the heartbeat signal has been received within the expected timeframe (53). If no, the system performs the operable action (56). If yes, the system asks whether the user has manually triggered the lockdown (54). If yes, the system performs the operable action (56). If no, the system is in normal operations (55). This system loops on itself to continually determine whether these steps are met to maintain normal operations, or to perform the operable action.

The above system also may include a "startup phase" wherein, the system as a whole, is first initiated, there is a grace period for activating the wireless kill switch (5). This startup phase and grace period is required so that if the wireless kill switch (5) is missing, damaged, or otherwise not present for some reason, the computer can still be utilized (although, without this security layer). Thus, upon startup, there is a predefined time window, e.g., 10, 30, 60, 90, or 120 seconds (inclusive of all times in between), where the wireless kill switch system can be deactivated if the wireless kill switch (5) is missing for these reasons, for example with a specific credential that is the same as or unrelated to the access credential. The startup would proceed with normal credentials, or a normal security beacon for authorized access being completed to verify the authorization to the computer and system as a whole. Indeed, the wireless kill switch is not utilized for activation or authorization, instead it only deactivates or deauthorizes the system back to the zero-state status. Indeed, this is one of the key security elements, that the wireless kill switch does not contain a receiver to allow for two-way communication between the computer and the wireless kill switch itself.

In certain embodiments, the system comprises an administrative wireless kill switch (5), wherein the administrative wireless kill switch has certain permissions that may be granted by an enterprise entity, for example. A limited number of such administrative wireless kill switches could be provided, wherein the administrative wireless kill switch has certain permissions to some or all computers within a given company or network. Thus, if a user forgets a wireless kill switch that is particular to the user's device, the user could obtain an administrative wireless kill switch to access their computer. The administrator could then assign a new wireless kill switch (5), authorize a temporary wireless kill switch (5), deactivate the software on the computer, or perform some other action as deemed appropriate.

In certain embodiments, the wireless kill switch (5) also comprises an LED indicator (14) to display the status of the wireless kill switch for example, the connection, the battery level, the activation of the physical button. Such an LED indicator (14) can serve as indicator lights and in conjunction with the microcontroller, display one or more lights, colors, patterns, etc. in order to provide a status indicator or to troubleshoot the device, as is necessary. Other indicators, such as sounds may replace the LED indicator (14) or work in conjunction with the same in order to provide status information.

In certain embodiments, the hardware further optionally comprises a wireless charging component (13), as depicted in FIG. 1. This allows for the wireless kill switch (5) to be placed into proximity of a charging component and to wirelessly charge the battery within the wireless kill switch (5). Such elements are well-known and can be purchased off-the-shelf for charging the battery within the housing. The wireless charging component (13) may instead be a wired port to charge or connect the wireless kill switch (5) to an electronic source.

Bluetooth Low Energy allows for virtually an unlimited number of pairings between the wireless kill switch (5) and a computer (having a receiver). Thus, a pairing may be made between a single wireless kill switch (5) and multiple different computers. A use case might include a single wireless kill switch (5) paired to a laptop, a table, a smart phone, and a wearable device, such as a smart watch owned by one user. Each of these devices would have created a connection between the wireless kill switch (5) and the computer, with certain software run on each computer that would allow connection to the unique ID of the wireless kill switch (5), such as a BLE ID, a MAC address, or another identification or unique ID to the particular wireless kill switch (5). Software on the computer then accepts and pairs the wireless kill switch (5) to the given computer, as is performed to create a pair with any such device.

Thus, the wireless kill switch (5) is able to be utilized with nearly any computer. For example, use of a wireless kill switch (5) with a laptop computer would allow for an operable action, such as returning the computer to a nonauthenticated state if the laptop was stolen while it was authenticated, because the wireless kill switch (5) would quickly perform the operable action once the continuous service signal was received at lower than the predetermined signal strength as set for the given computer (beyond the user defined envelope), or if the heartbeat was missing.

The same actions could be performed where the computer is a handheld tablet that is stolen when it is in an unlocked stated. As soon as the thief moves the handheld tablet beyond the user defined envelope, the continuous signal would be received below the RSSI threshold and perform the operable action. This could immediately lock the tablet. A thief may understand that the locked tablet is thus worthless and drop the tablet and move on.

This may be even more valuable when it comes to theft of mobile telephones, which are highly sophisticated computers, and often contain many linked payment accounts and other sensitive information for the user. Mobile telephones are a frequent target of criminals, who snatch them when in use, to maintain the unlocked status. However, if the wireless kill switch (5) is used as soon as the mobile telephone passes beyond the user defined envelope, the mobile telephone will lock and render it all but worthless.

Finally, if a criminal seeks to tamper with software on a computer or to damage a wireless kill switch (5) for any reason, such tampering may damage or render the continuous signal or the heartbeat signal void, and thus one or both may be eliminated and thus cause the software on the computer to perform the operable action. Thus, such wireless kill switch (5) has a wide set of potential uses in order to provide security for computers.

It will be appreciated that the embodiments and illustrations described herein are provided by way of example, and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various systems, devices, and methods may include one or all of the limitations of an embodiment, be performed in any order, or may combine limitations from different embodiments, as would be understood by those implementing the various methods, devices, and systems detailed herein.

What is claimed is:

1. A method of remotely modifying a state of a computer from an authenticate state to a nonauthenticated state comprising:
   a. transmitting from a paired wireless kill switch a first transmitted signal which is a continuous service signal and a second, separate transmitted signal which is a heartbeat signal and is defined as a data packet in a separate transmission from the first transmitted signal;
   b. receiving at the computer the continuous service signal and the heartbeat signal from a paired device;
   c. after receiving the continuous service signal, determining whether the continuous service signal is above a predefined threshold;
   d. determining whether the heartbeat signal is received within a predefined time period; and
   e. performing an operable action to transfer the computer from a first operational state to a second, nonauthenticated state upon the occurrence of either (1) receipt of the continuous service signal at below the predefined threshold, (2) omission of the heartbeat signal inside of the predefined time period, or both.

2. The method of claim 1 further comprising wherein the continuous service signal is generated from a transmitter within said paired wireless kill switch, wherein said transmission capabilities are Bluetooth Low Energy transmission.

3. The method of claim 1 wherein the continuous service signal is transmitted at between every 1 millisecond and every 10 seconds.

4. The method of claim 1 wherein the continuous service signal and the heartbeat signal are encrypted.

5. The method of claim 1 wherein the predefined threshold is based upon a received signal strength indicator.

6. The method of claim 5 wherein the received signal strength indicator is defined between −99 dBm and −1 dBm.

7. A system comprising:
   a wireless kill switch and a computer;
   said wireless kill switch comprising a housing, a radio transmitter, a microcontroller, an operable button, a battery, and firmware sufficient to operate and transmit a signal from said radio transmitter;
   said housing encasing the radio transmitter, the microcontroller, and the battery and allowing for operation of the operable button;
   said computer comprising software enabled to receive, from a receiver, a transmission from the wireless kill switch;
   the firmware of the wireless kill switch performing, together with the software of the computer, a method comprising:
   transmitting from the radio transmitter a continuous service signal to be received by the receiver on said computer and a second a distinct transmission of a heartbeat signal generated as a data packet on a first predetermined time basis;
   maintaining an authenticated state upon receipt of the both of the continuous service signal at a predefined signal threshold and receipt of the heartbeat signal received within at least a second predetermined time basis; and
   performing at the computer an action to modify the computer to a nonauthenticated state upon omission of the continuous service signal at the predefined threshold or omission of the heartbeat signal inside of the second predetermined time basis.

8. The system of claim 7 further comprising wherein the predefined threshold is a user-defined signal threshold wherein the operational state is maintained when the continuous service signal is received at above the user-defined signal threshold, and wherein the user-defined signal threshold corresponds to a measured decibel level from the continuous service signal.

9. The system of claim 7 wherein the first predetermined time basis is between 10 millisecond and 60 seconds and wherein the second predetermined time basis is equal to or longer than the first predetermined time basis.

* * * * *